Figure 9:
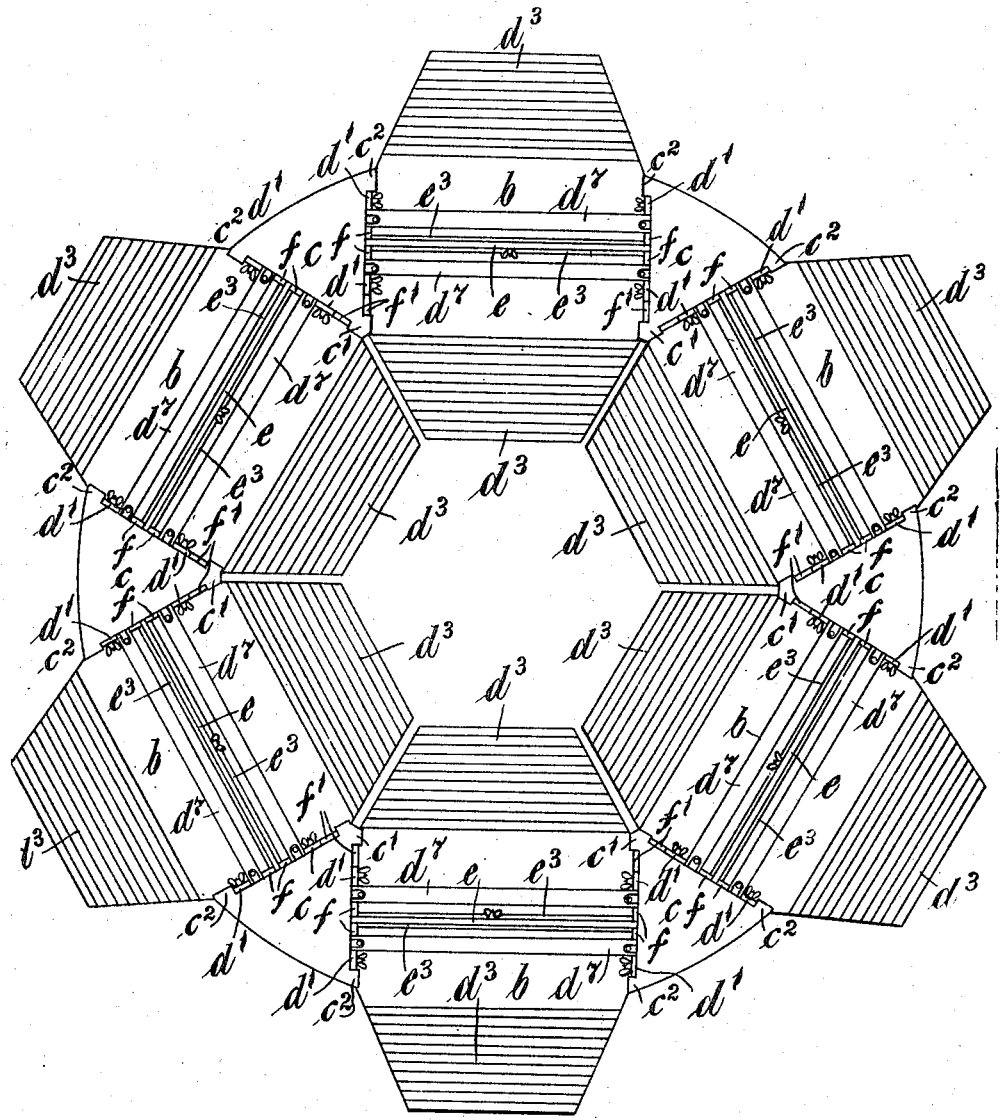

J. F. WEBB & W. W. WILLIAMS.
APPARATUS FOR BLEACHING BY ELECTROLYSIS.
APPLICATION FILED FEB. 25, 1915.
1,175,572.
Patented Mar. 14, 1916.
4 SHEETS—SHEET 1.
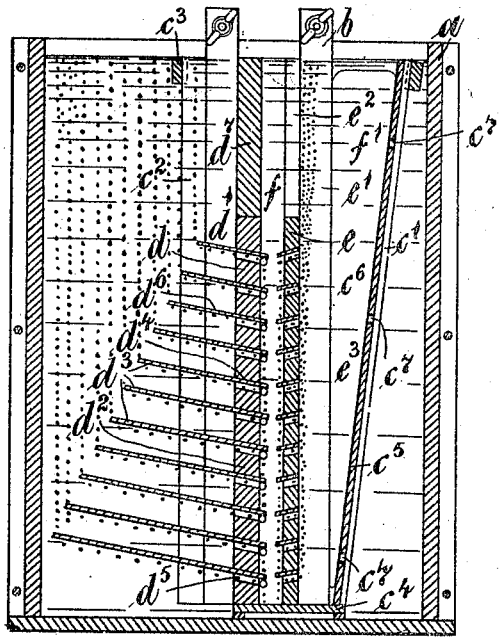
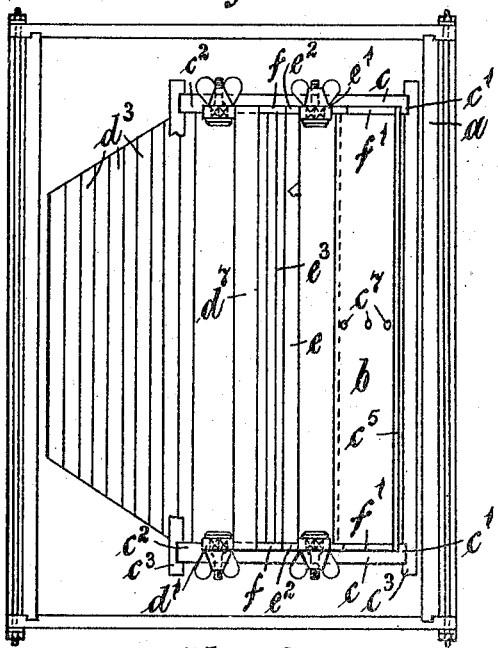

J. F. WEBB & W. W. WILLIAMS.
APPARATUS FOR BLEACHING BY ELECTROLYSIS.
APPLICATION FILED FEB. 25, 1915.
1,175,572.
Patented Mar. 14, 1916.
4 SHEETS—SHEET 2.
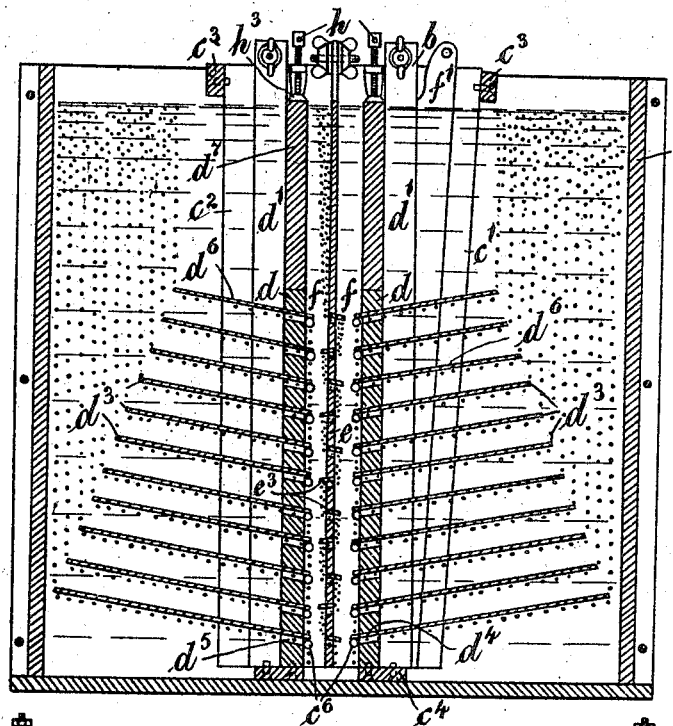
Fig. 5.
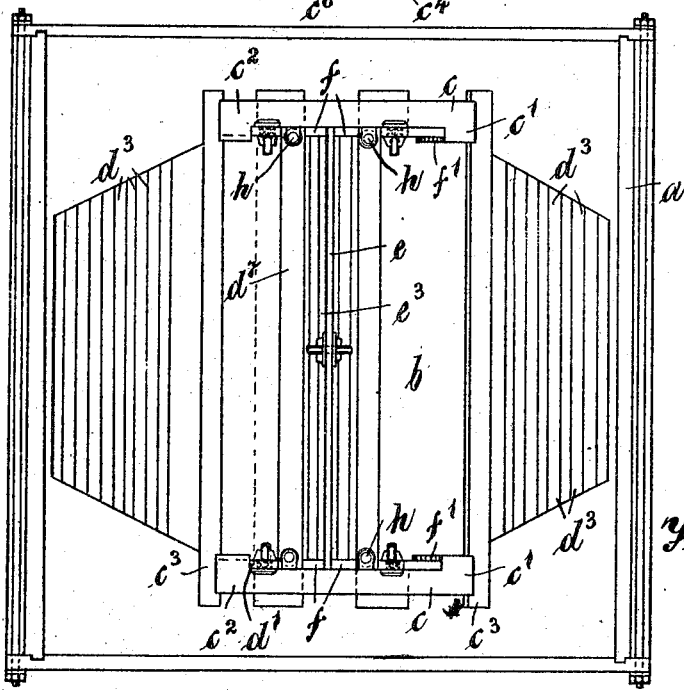
Fig. 3.
Fig. 6.
WITNESSES:
INVENTORS

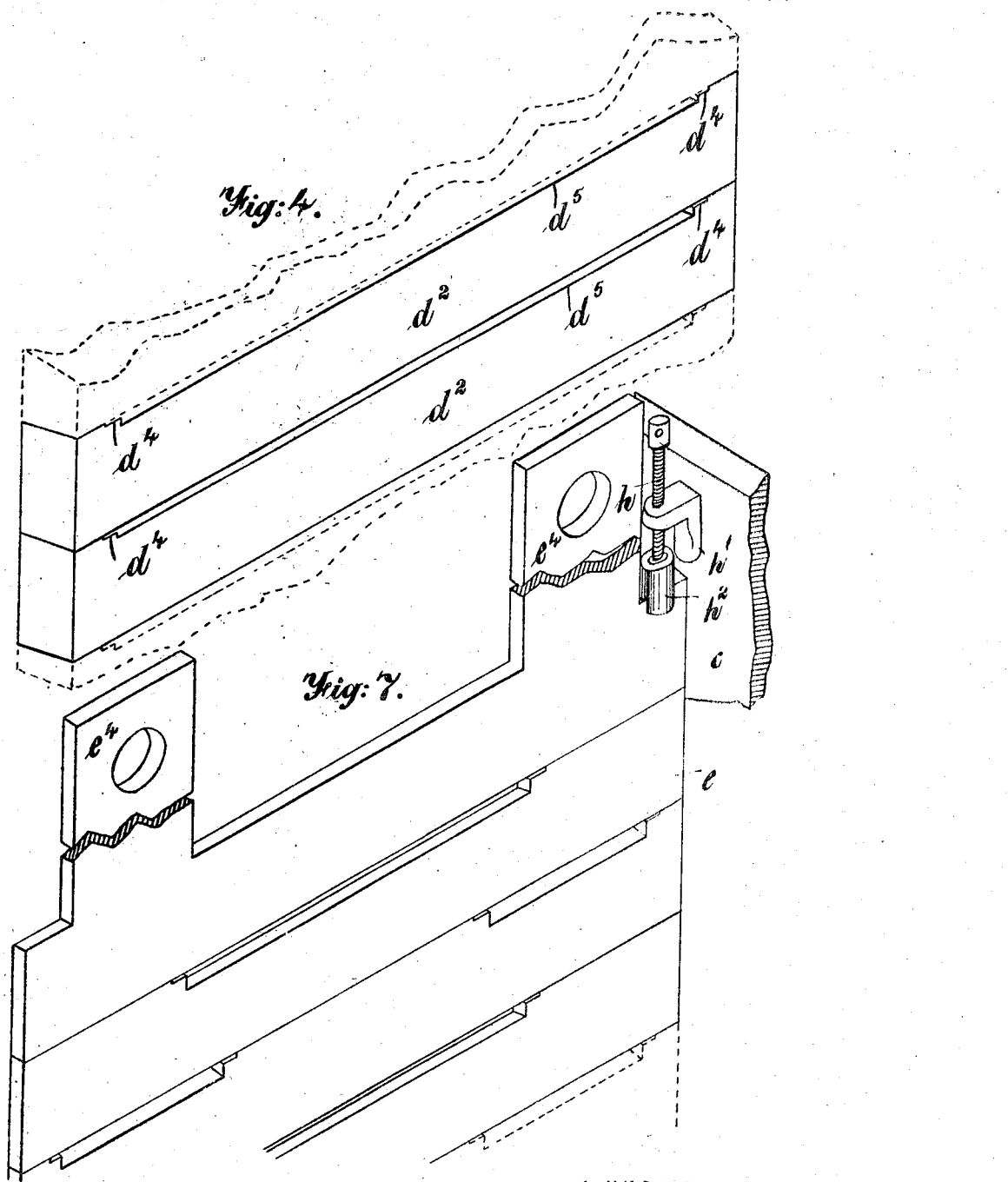

UNITED STATES PATENT OFFICE.

JOHN FREDERICK WEBB, OF BATTERSEA, LONDON, AND WILLIAM WILLOUGHBY WILLIAMS, OF ENHAM, ENGLAND.

APPARATUS FOR BLEACHING BY ELECTROLYSIS.

1,175,572. Specification of Letters Patent. Patented Mar. 14, 1916.

Application filed February 25, 1915. Serial No. 10,537.

*To all whom it may concern:*

Be it known that we, JOHN FREDERICK WEBB and WILLIAM WILLOUGHBY WILLIAMS, subjects of the King of Great Britain and Ireland, residing, respectively, at 21 Louvain road, Battersea, in the county of London, England. and Enham, in the county of Hants, England, have invented new and useful Improvements in and Relating to Apparatus for Bleaching by Electrolysis, of which the following is a specification.

This invention relates to an improved apparatus for the preparation of a bleaching fluid by the action of electrolysis upon a solution of sodium or magnesium chlorid. In apparatus for this purpose, in the past, considerable difficulty has been experienced in isolating the hydrogen formed at the negative electrode and preventing it from recombining with the solution, the means such as a porous plate being disposed between the electrodes. The introduction of a medium between the electrodes causes an evolution of free chlorin resulting in the production of a solution of caustic alkali which has a very detrimental effect upon the cellular or physical structure of the material treated.

The object of this invention is the provision of means whereby isolation of the gases evolved at the electrodes from one another is readily obtained with total absence of free chlorin and the preparation of a liquid, as a result, which when used for bleaching purposes has no deleterious effect upon the cellular or physical structure of the material treated and by an expenditure of current relatively small when compared with known processes.

The invention consists in the formation of electrodes with orifices; the said orifices being provided with means adapted to entrain the gases evolved on the active surfaces of the said electrodes and transmit them through the said orifices along a predetermined path whereby complete isolation of the gases from each other is effected. The said electrodes are arranged without interposed diaphragms in a vat or the like containing sodium or magnesium chlorid in solution and chlorin will be evolved the whole being absorbed in the production of sodium hypochlorite. Upon the passage of an electric current of suitable potential through these electrod sodium or magnesium hypochlorite as the case may be is formed and simultaneously dissolved in the liquid in manner well known while free hydrogen is evolved at the negative electrode and a certain amount of free oxygen at the positive electrode.

To prevent the absorption of the hydrogen evolved by the liquid we provide deflectors on the active side of the negative electrode adapted to trap the said hydrogen and when it is required to still further safeguard the liquid we provide orifices in the said electrode adapted to receive the gas from the deflectors and convey it to the opposite side of the said electrode where it is allowed to rise freely in a vertical stream of bubbles. With regard to the gas generated at the positive electrode as it is desired to use this as mechanical means for circulating the liquid we provide large deflectors and dispose them in orifices in the said electrode. These deflectors are adapted to convey the gas from the active side of the electrode and distribute it in the body of the liquid thereby instituting and maintaining continual circulation.

We have found in practice that positive electrodes composed of highly compressed Acheson graphite to be most effective for our purpose and have described hereinafter particular constructions which this material necessitates but we desire it to be understood that good quality carbon may be used in the smaller forms without departing from the invention. Under the electrolytic action considerable heat is generated and if found desirable we may provide cooling means such as a cold water coil adapted to prevent any rise of temperature beyond a predetermined point.

In order that the invention may be the better understood we will now proceed to describe the same with relation to the accompanying drawings, reference being had to the letters and figures marked thereon.

Like letters refer to like parts in the various figures, in which:—

Figure 1 is a sectional elevation of one form of apparatus adapted to carry out our invention in which one negative and one positive electrode only are used. Fig. 2 is a plan view of the apparatus illustrated in Fig. 1. Fig. 3 is a detail of one of the terminal blocks used in the form of construction illustrated in Figs. 1 and 2. Fig. 4 is a view showing the construction of the electrodes. Fig. 5 is a sectional elevation of our apparatus in which one negative and two positive electrodes are employed. Fig. 6 is a plan view of the apparatus illustrated in Fig. 5. Fig. 7 is a detail view of an alternative construction of the electrodes. Fig. 8 is a detail view of one of the side plates used in the construction illustrated in Figs. 5 and 6. Fig. 9 is a plan view of a modified construction in which six negative and twelve positive electrodes are employed.

Referring to Figs. 1 and 2 of the drawings $a$ indicates the vat adapted to contain the electrolyte composed of a solution of sodium or magnesium clorid and within which the electrolyzing element $b$ is disposed. The element $b$ consists of two side plates $c$ $c$ of slate, porcelain or similar material adapted to resist chemical action, each of which is provided with two flanges $c'$, $c^2$; the flange $c'$ being angularly disposed relative to the flange $c^2$ for purposes to be described. The side plates $c$ $c$ are connected together by straps $c^3$ $c^3$ and cover plates $c^4$ adapted to firmly maintain the said side plates $c$ $c$ in position. Against the flanges $c^2$ $c^2$ the positive terminal blocks $d'$ $d'$ formed of carbon, graphite or the like are disposed and are adapted to contact with the margins of the positive electrode $d$ and distribute the current evenly to the said electrode $d$. The negative electrode $e$ is arranged in proximity to the positive electrode $d$ and contacts at its margins with terminal blocks $e'$ $e'$ formed of carbon, graphite or the like. Between the positive electrode $d$ and the negative electrode $e$ separators $f$ $f$ of slate, porcelain or the like are disposed and adapted to contact with the margins of and maintain the said electrodes $d$ and $e$ a fixed predetermined distance apart. As it is required to isolate the gas evolved at the negative electrode from the bulk of the electrolyte and it is desired that the electrodes $d$ and $e$ shall terminate some distance below the level of the liquid, a partition $d^7$ of electrical non conducting material is provided above the electrode $d$ and has similar marginal dimensions thereto while the cover plate $c^4$ is so arranged as to contact with the lower end of the electrode $d$. To close up the remaining open side of the part containing the negative electrode $e$ a plate $c^5$ is provided which abuts against the flanges $c'$ $c'$ on its sides and against the cover plate $c^4$ at its lower edge. To maintain the electrodes $d$ and $e$, the terminal blocks $d'$ $d'$ and $e'$ $e'$, the separators $f$ $f$ and the plate $c^5$ firmly in position in a readily removable manner wedges $f'$ $f'$ composed of slate, porcelain or the like are provided and whose angularity corresponds with that which exists between the flanges $c'$ and $c^2$. To provide equality of pressure throughout the surfaces in contact slips $e^2$ $e^2$ having the same marginal dimensions as the electrodes $e$ are inserted in the spaces between the separators $f$ $f$ and the terminal blocks $e'$ $e'$ above the electrode $e$.

We have found in practice that the best results are obtained when the positive electrode $d$ and the terminal blocks $d'$ $d'$ and $e'$ $e'$ are formed of Acheson graphite which can be obtained in a highly compressed state suitable for our purpose and in order to simplify the method of construction of the electrodes and at the same time utilize the material in the most economical manner we form the said electrodes of bars $d^2$ (see Fig. 4). The negative electrode $e$ may be similarly formed or may be made of a suitable metal such for example as lead or as may be most desirable.

In addition to partially inclosing the negative element $e$ steps must be taken to prevent the gases evolved at the electrodes intermingling and for that purpose we provide series of deflectors $d^3$ and $e^3$ formed of glass or the like in association with the electrodes $d$ and $e$ respectively. The deflectors $d^3$ (the lower of which are of relatively large dimensions as compared with the upper ones) also owing to the continual passage of gas on their surfaces during operation institute and maintain a constant circulation of the liquid thereby maintaining the whole of the said liquid at equal strength. To effect this the deflectors $d^3$ pass through slots $d^4$ in the electrode $d$ and project a short distance from the active surfaces of the said electrode $d$ so as to trap the bubbles of gas evolved and to permit the passage of the gas along the deflectors $d^3$ the slots $d^4$ are enlarged at $d^5$ in the substance of the electrode $d$ at the edge of the bars $d^2$ the said deflectors $d^3$ being inclined as shown to induce the gas to flow in the direction required from natural causes. As will be seen the deflectors $d^3$ decrease in length as they more nearly approach the surface of the liquid thus providing complete circulation which may be increased by the use of holes $c^6$. The deflectors $e^3$ are carried by the negative electrode $e$ in similar manner.

In use it has been found that the positive plate deteriorates and after a time has not sufficient strength to support the said deflectors $d^3$ therefore we provide grooves $d^6$ in the terminal blocks $d'$ as shown in Fig. 3 or in the flanges $c'$ $c'$ $c^2$ $c^2$ as shown in Fig. 8. The deflectors $e^3$ carried by the negative electrode $e$ also project slightly on the active surface but do not project on the posterior side thereby permitting the bubbles of gas to rise to the surface of the liquid by the shortest possible route. It has not been found necessary to provide additional supporting means for the deflectors $e^3$ as the integrity of the electrode $e$ is not destroyed in use. To maintain equality of temperature throughout the bulk of the liquid small holes $c^7$ $c^7$ are provided in the plate $c$.

Referring to Figs. 5 and 6 it will be seen that the construction adopted obviates the inoperative surface of the negative electrode produced in the construction illustrated in Figs. 1 and 2. As a consequence to both sides of the negative electrode being operative we arrange the deflectors $e^3$ so that they project on alternate sides and at alternate angles in order to transfer the gas from side to side and prevent its dispersion as indicated by the streams of bubbles shown. To support this electrode $e$ four separators $f$ $f$ $f$ $f$ are provided and are so arranged that each margin of the said electrode $e$ is clamped between two of the said separators $f$ $f$. Adjacent to and adapted to have their margins supported by the said separators $f$ $f$ $f$ $f$ are the electrodes $d$ $d$ which have the terminal blocks $d'$ $d'$, $d'$ $d'$ in contact therewith and which are maintained firmly in position by the wedges $f'$ $f'$ acting in conjunction with the flanges $c'$ $c'$ $c^2$ $c^2$ on each side plate $c$ $c$ as in the previous construction.

In dealing with built up electrodes as illustrated in Fig. 4 we find that under certain conditions it is advisable to use considerable pressure in holding the bars in contact and for maintaining the contact during use. For this purpose we arrange clamping means such for example as screws $h$ (Figs. 5, 6, and 7) adapted to hold the bars in contact with each other in an easily regulatable manner. Each screw $h$ is carried by a bracket $h'$ attached to the side plate $c$ of the device $b$ and contacts with slate or porcelain plates or bars $h^2$ so as to preserve the electrodes $d$ or $e$ or their extensions from mechanical injury (see Fig. 7). When graphite plates are used as the negative electrode we find it advisable to arrange them as shown in Fig. 7 which provides for the separation of alternate deflectors $e^3$ into two portions. By this means more contact is provided from bar to bar and the electrical resistance is considerably reduced; the contact area between all the bars being equal to the cross section of the lugs $e^4$. In dealing with large quantities of liquid a number of electrolyzing devices $b$ may be connected together in a single formation as shown in Fig. 9 in which six devices $b$ are symmetrically arranged about a common axis. This arrangement also provides for an increased electrical terminal tension by connecting the devices in series. It is obvious that we may use electrodes of circular formation and dispose them within one another and provide through the substance of the electrodes orifices and slots adapted to permit the passage of gas and the support of the deflectors so as to operate in the manner already described. To maintain the temperature of the electrolyte at a fixed predetermined point we may provide a cold water coil or other cooling device adapted to operate in known manner.

Although throughout the above description the electrodes $d$ or $e$ have been described as being composed of individual bars we may if we so prefer combine two, three or more of the said bars together to form an element and two or more of such elements to form an electrode.

We claim:

1. Apparatus for the preparation of bleaching fluid by the action of electrolysis having, in combination, a vat for containing the electrolyte, a negative electrode or electrodes, deflectors mounted on said electrode or electrodes adapted to collect the gas formed on or adjacent to said electrode or electrodes and transmit it to the other side thereof so as to prevent dispersion, a positive electrode or electrodes, and deflectors mounted on said electrode or electrodes adapted to collect the gas formed on the active side of the said electrode or electrodes and transmit it to the other side thereof and distribute it in the body of the electrolyte so as to set up and maintain the circulation of the said electrolyte in a predetermined direction.

2. Apparatus for the preparation of bleaching fluid by the action of electrolysis having, in combination, a vat for containing the electrolyte, a negative electrode or electrodes having orifices therein, inclined deflectors mounted in said orifices in said electrode or electrodes adapted to collect the gas formed on or adjacent to said electrode or electrodes and transmit it to the other side thereof through the said orifices so as to prevent dispersion, the gases during such transmission being always in contact with the under surface of the said deflectors, a positive electrode or electrodes having orifices therein, and inclined deflectors mounted in said orifices in said electrode or electrodes adapted to collect the gas formed on the active side of the said electrode or electrodes and transmit it to the other side thereof through the said orifices and distribute it in the body of the electrolyte so as to set up and maintain the circulation of the said electrolyte in a predetermined direction, the gases during such transmission being always in contact with the under surface of said deflectors.

3. Apparatus for the preparation of bleaching fluid by the action of electrolysis having, in combination, a vat for containing the electrolyte, a positive electrode, a negative electrode having orifices therein, inclined deflectors mounted in said orifices in the said electrode adapted to collect the gas formed on or adjacent to the said electrode or electrodes and transmit it to the other side through the said electrode so as to prevent rearward dispersion of the gas from the said negative electrode into the body of the electrolyte, the gas during transmission being always in contact with the under surface of the said inclined deflectors, slots in said negative electrodes adapted to maintain said deflectors in position, and terminal bars of electric conducting material in contact with said negative electrodes adapted to distribute electric energy uniformly to parts of said negative electrode.

4. Apparatus for the preparation of bleaching fluid by the action of electrolysis having in combination, a vat for containing the electrolyte, a negative electrode, a positive electrode or electrodes having orifices therein, inclined deflectors of non-conducting material mounted in said orifices adapted to distribute gas throughout the body of the electrolyte, orifices adjacent thereto adapted to permit the passage of gas through the said electrode, the said gas being always in contact with the under side of the said deflectors, terminal bars of electric conducting material adapted to contact with said positive electrode and distribute electric energy uniformly to parts thereof, and inclined grooves in said terminal bars adapted to connect and maintain in position the said deflectors.

5. Apparatus for the preparation of bleaching fluid by the action of electrolysis having in combination a vat for containing the electrolyte, a negative electrode or electrodes having orifices therein, inclined deflectors mounted in said orifices in said electrode or electrodes adapted to collect the gas formed on or adjacent to said electrode or electrodes and transmit it to the other side thereof through the said orifices so as to prevent dispersion, the gases during such transmission being always in contact with the under surface of the said deflectors, a positive electrode or electrodes having orifices therein, inclined deflectors mounted in said orifices in said electrode or electrodes adapted to collect the gas formed on the active side of the said electrode or electrodes and transmit it to the other side thereof through the said orifices and distribute it in the body of the electrolyte so as to set up and maintain the circulation of the said electrolyte in a predetermined direction, the gases during such transmission being always in contact with the under surface of said deflectors, separators adapted to maintain the active surfaces of the electrodes a predetermined distance apart, terminal bars of electric conducting material adapted to distribute electric energy uniformly to parts of said electrodes, and wedges contacting with fixed abutments thereby maintaining the electrodes in intimate contact with the said terminal bars and said separators.

In testimony whereof we have signed our names to this specification in the presence of two subscribing witnesses.

JOHN FREDERICK WEBB.
WILLIAM WILLOUGHBY WILLIAMS.

Witnesses:
WALTER CARVER,
H. D. JAMESON.

Copies of this patent may be obtained for five cents each, by addressing the "Commissioner of Patents, Washington, D. C."